United States Patent [19]

Hawkinson

[11] Patent Number: 4,764,037
[45] Date of Patent: Aug. 16, 1988

[54] CAGE FOR BALL BEARING ASSEMBLY

[75] Inventor: Elden L. Hawkinson, Canoga Park, Calif.

[73] Assignee: Rockwell International Corporation, El Segundo, Calif.

[21] Appl. No.: 36,628

[22] Filed: Apr. 10, 1987

[51] Int. Cl.⁴ .............................................. F16C 33/44
[52] U.S. Cl. .................................... 384/527; 384/572; 384/902
[58] Field of Search ............... 384/492, 523, 527, 572, 384/573, 576, 902, 907, 909, 910

[56] References Cited

U.S. PATENT DOCUMENTS 3,362,762  1/1968  Haller .................................... 384/572
4,223,963  9/1980  Glodin et al. ........................ 384/527

FOREIGN PATENT DOCUMENTS 0010140  1/1980  Japan .................................... 384/527

Primary Examiner—Stuart S. Levy
Assistant Examiner—Thomas R. Hannon
Attorney, Agent, or Firm—H. Fredrick Hamann; Harry B. Field; Clark E. DeLarvin

[57] ABSTRACT

A ball bearing assembly for operation immersed in liquid oxygen at pressures in excess of 1000 psi and at rotational speeds in excess of 10,000 revolutions per minute. A bearing assembly comprising an inner and outer race, a plurality of spherical ball bearings dispersed therebetween and a cage member for maintaining the bearings in spaced-apart relation with respect to one another. The improvement comprises forming the cage member from a liquid oxygen compatible porous metal impregnated with a liquid oxygen compatible polyhalogenated hydrocarbon for adding lubricity to the cage member. The preferred porous metal is a 300 series CRES alloy and the preferred polyhalogenated hydrocarbon is either fluorinated ethylenepropylene or polytrichlorotrifluoroethylene.

6 Claims, 1 Drawing Sheet

CAGE FOR BALL BEARING ASSEMBLY

BACKGROUND OF THE INVENTION

1. Field of the Invention

The present invention broadly relates to a ball bearing assembly required to operate at a high RPM while immersed in a cryogenic fluid maintained under elevated pressure. It particularly relates to a bearing ball separator or cage for use in such an assembly.

2. Prior Art of the Invention

Many of the bi-propellant rocket (reaction) engines currently in use today utilize liquid oxygen as the oxidizer and either hydrogen or kerosene for the fuel. Since the efficiency of the engine is a function of, among other things, chamber pressure, it is essential that propellants be supplied at a high pressure. For example, a turbine-driven liquid oxygen pump may be required to have a discharge pressure as high as 8000 psi or more. The present turbo pumps are designed such that the bearings are located in a region where the liquid oxygen pressure does not exceed about 1000 pounds per square inch (psi) since the component keeping the spherical balls separated, the bearing ball separator or cage, has a limited oxygen pressure compatibility. It must be appreciated that there are numerous materials which are compatible with liquid oxygen at ambient pressure. However, at elevated pressures the number of compatible materials decreases substantially. The highest pressure at which a component may be considered compatible in liquid oxygen is determined in accordance with the 10 kilogram-meter (kgm) requirement of NASA's Marshall Space Flight Center (MSFC) Specification 106. Broadly, this comprises taking a sample of the material of which the component is made and immersing it in liquid oxygen contained within a sealed chamber. The specimen is then subjected to an impact equivalent to a 10 kilogram object falling 1 meter. During this test, the pressure within the sealed chamber is monitored, any abrupt increase in pressure (indicating a reaction between the liquid oxygen and some constituent of the sample) indicates that the use of the component at that particular pressure would not be safe (not compatible). Twenty consecutive samples of the material from the same lot must pass this test for the material to be rated acceptable for use at the test pressure.

Current bearing cages are made from a laminated cylinder of glass fabric reinforced polytetrafluoroethylene (PTFE). The process results in glass fiber bundles or threads that are coated but not impregnated with the PTFE. As a result, the laminated cylinder is very porous and subject to considerable opportunities for contamination. Thus, the separator or cage is limited to use in regions of the turbo pump where the liquid oxygen pressures do not exceed 1000 pounds. This results in serious design problems for high pressure oxygen pumps where discharge pressures may be as high as 8000 psi and future pumps will be required to provide even greater discharge pressures.

OBJECTS OF THE INVENTION

It is an object of the invention to provide a bearing ball cage having sufficient strength to withstand the tensile stress generated by the cage rotating at a speed in excess of 10,000 revolutions per minute.

It is another object of the invention to provide a bearing ball cage formed from the material compatible with liquid oxygen at pressures at least 8,000 psi.

Still another object of the invention is to provide a bearing ball cage formed from a material which provides low friction with the bearing ball and in which wear products from the cage provide additional lubrication for the balls to contact with the races as well as the cage itself.

Still another object of the invention is to provide a bearing assembly suitable for use in a high pressure, high rotational speed, liquid oxygen turbo pump for use on a rocket engine.

SUMMARY OF THE INVENTION

The present invention provides an improvement in ball bearing assemblies required to operate immersed in liquid oxygen at elevated pressures and at high rotational speeds. A typical ball bearing assembly comprises an inner race, an outer race, a plurality of spherical ball bearings dispersed therebetween and a cage member for maintaining the ball bearings in a spaced-apart relationship with respect to one another. There are numerous materials which may be utilized for the races and ball bearings which would be compatible at high pressures and high rotational speeds. The cage member, however, must provide some lubricity and materials utilized heretofore have been limited to liquid oxygen pressures of less than about 1000 psi.

The present invention provides an improvement in the cage member which permits it to operate at pressures in excess of 1000 psi and at rotational speeds of at least 10,000 RPM. The improvement comprises forming a cage member from a liquid oxygen compatible porous metal impregnated with a liquid oxygen compatible material for enhancing lubricity to the metal, the material comprising a halogenated hydrocarbon. In accordance with the particularly preferred embodiment of the invention the porous metal is a sintered metal consisting essentially of a 300 series CRES alloy and the polyhalogenated hydrocarbon is a fluorinated hydrocarbon selected from the group consisting of fluorinated ethylenepropylene and polytrichlorotrifluoroethylene. In accordance with another aspect of the invention, the polyhalogenated hydrocarbon includes a minor amount of molybdenum disulfide.

DESCRIPTION OF A PREFERRED EMBODIMENT

Figure 1:
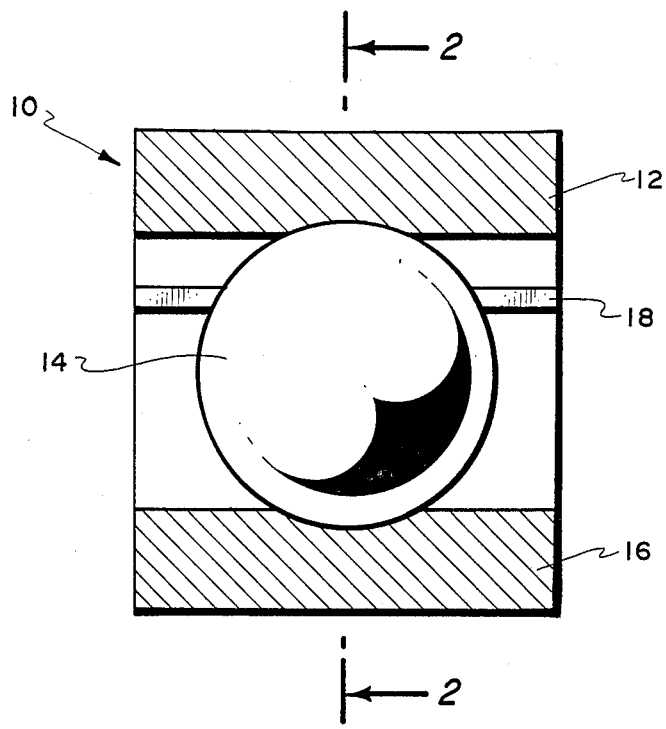
FIG. 1 is a plan view of a typical ball bearing assembly.
Figure 2:
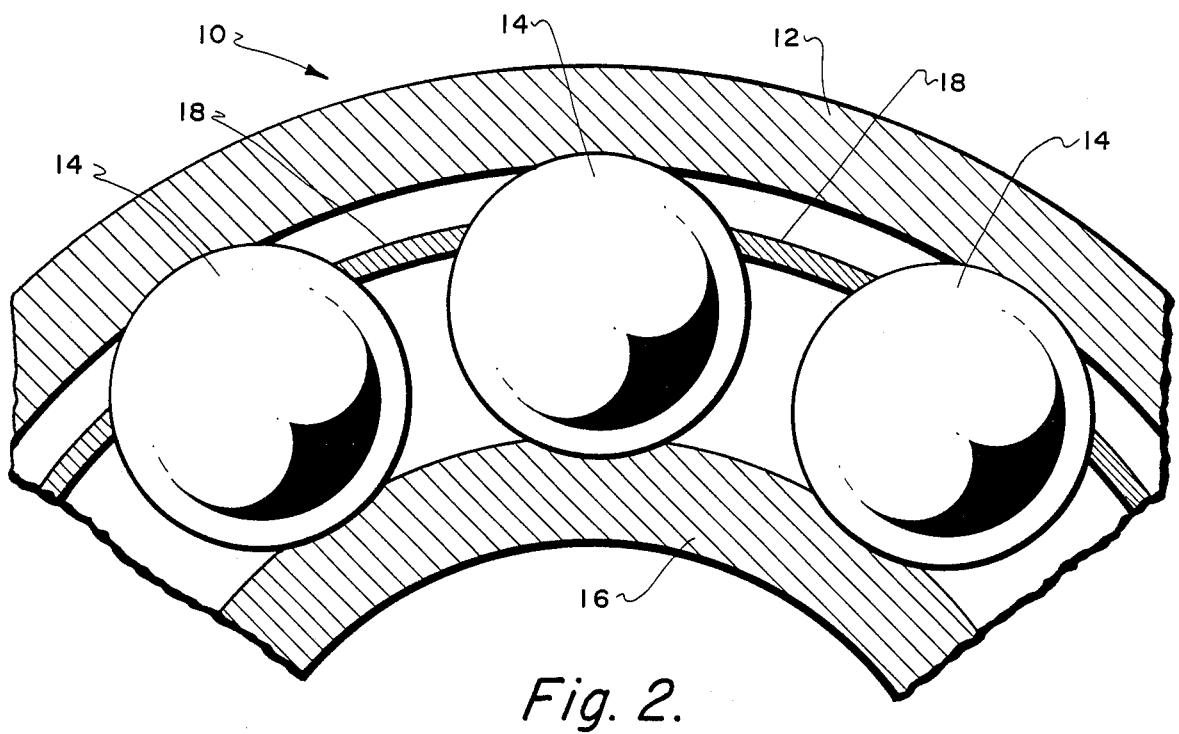
FIG. 2 is a section view of FIG. 1 taken along cutting plane 2—2.

Referring to FIGS. 1 and 2 therein is depicted a typical ball bearing assembly 10. Assembly 10 includes an outer race 12, a plurality of spherical balls 14, an inner race 16 and a cage 18 for maintaining the balls in a spaced-apart relation with respect to one another. The cage of the present invention may be formed from any of several alloys which are commercially available and may be so processed that they are acceptable for 8000 psi or greater oxygen service by NASA. Examples of such material include among others, the 300 series CRES alloys (347, 321 and 316). The selection of the exact metal will vary depending upon the bearing size and cage rotational requirements.

An essential aspect of the present invention is that the metal is porous. Several commercially available metallic porous materials are available and the selection with respect to how the porosity is obtained is not critical. Thus, the porous metallic material may comprise sintered metal particles of finite size and configuration or random size and configuration. In a similar manner, it may be formed from sintered metal fibers or wire with random fiber placement or well-defined fiber placement. Thus, the fibers may be continuous or discontinuous and may have a variety of cross-section configurations. The key aspect of the material is that it have sufficient porosity to accept a polyhalogenated hydrocarbon. Particularly preferred polyhalogenated hydrocarbons are the fluorinated hydrocarbon materials such as fluorinated ethylenepropylene and polytrichlorotrifluorethylene. Both of these materials satisfy the oxygen compatibility requirements and are readily amenable to processing for impregnation into the porous metal.

In forming the cage of the present invention a part is either finish-machined or rough-machined from the porous metal, cleaned and then dried. Thereafter, the part is placed in a sealed container containing the molten polyhalogenated fluorocarbon (polymer). The part may be immediately immersed in the molten polymer and the chamber pressurized to ensure migration of the polymer through the pores of the part. Alternatively, the chamber may be evacuated first to remove air or other gases from the part and polymer, and thereafter pressurize the chamber with an inert gas and submerge the part in the molten polymer. In such a latter event, to enhance air removal, it is advantageous to keep the part suspended above the polymer surface during the initial vacuum application and then lower the part into the polymer before pressurizing the chamber with an inert gas. Advantageously, the polymer will include from 5 to 25 wt % of molybdenum disulfide based on the total weight of polymer and $MoS_2$. Following treatment, the part is removed from the molten polymer and cooled to allow the polymer to solidify. Thereafter, final machining of the bearing cage may be accomplished as required to obtain net dimensions where the bearing cage was initially rough-machined. Alternatively, if the cage was initially machined to net dimensions then it is treated to remove any excess polymer. Bearing cages so produced are suitable for use immersed in liquid oxygen at pressures in excess of 5000 psi and even as high as 8000 Ipsi. Further, it will have sufficient strength to resist the tensile stresses generated by the cage rotating at up to 15,000 revolutions per minute or more.

It will be apparent that many modifications and variations of the present invention are possible in light of the above teachings. It is to be understood, therefore, that within the scope of the appended claims the invention may be practiced otherwise than as specifically described.

What is claimed is:

1. In a ball bearing assembly required to operate immersed in liquid oxygen at a pressure in excess of 1000 psi and at rotational speeds of at least 10,000 revolutions per minute, wherein the ball bearing assembly including an inner race, and outer race, a plurality of spherical ball bearings dispersed therebetween and a cage member for maintaining said ball bearings in a spaced apart relationship with respect to one another, the improvement in the cage member comprising;

a liquid oxygen compatible, porous metal impregnated with a liquid oxygen compatible material for adding lubricity to the metal, said material comprising a polyhalogenated hydrocarbon.

2. The bearing of claim 1 wherein said porous metal is a sintered metal consisting essentially of a 300 series CRES alloy.

3. The bearing of claim 2 wherein said polyhalogenated hydrocarbon includes from about 5 to 25 wt % molybdenum disulfide.

4. The bearing of claim 3 wherein said polyhalogenated hydrocarbon is selected from the group consisting of fluorinated ethylenepropylene or polytrichlorotrifluoroethylene.

5. The bearing of claim 1 wherein said polyhalogenated hydrocarbon selected from the group consisting of fluorinated ethylene propylene or polytrichlorotrifluoroethylene.

6. The bearing of claim 1 wherein said polyhalogenated hydrocarbon includes a minor amount of molybdenum disulfide.

* * * * *